US009641325B1

(12) United States Patent
Camenisch et al.

(10) Patent No.: US 9,641,325 B1
(45) Date of Patent: May 2, 2017

(54) SERVER SYSTEMS FOR DISTRIBUTED CRYPTOGRAPHIC PROTOCOLS

(71) Applicant: International Business Machines Corporation, Armonk, NY (US)

(72) Inventors: Jan L. Camenisch, Rueschlikon (CH); Mark Korondi, Rueschlikon (CH); Daniel Kovacs, Rueschlikon (CH); Michael C. Osborne, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/928,813

(22) Filed: Oct. 30, 2015

(51) Int. Cl.
| | |
|---|---|
| *H04L 9/08* | (2006.01) |
| *H04L 9/14* | (2006.01) |
| *H04L 9/30* | (2006.01) |
| *G06F 9/455* | (2006.01) |
| *H04L 9/00* | (2006.01) |

(52) U.S. Cl.
CPC .......... *H04L 9/085* (2013.01); *G06F 9/45558* (2013.01); *H04L 9/008* (2013.01); *H04L 9/088* (2013.01); *H04L 9/0861* (2013.01); *H04L 9/14* (2013.01); *H04L 9/30* (2013.01); *G06F 2009/45587* (2013.01)

(58) Field of Classification Search
CPC ... H04L 9/14; H04L 9/30; H04L 9/088; H04L 9/008; H04L 9/085; G06F 2009/45562; G06F 9/45558
See application file for complete search history.

(56) References Cited

U.S. PATENT DOCUMENTS

| | | | | | |
|---|---|---|---|---|---|
| 5,625,692 | A | * | 4/1997 | Herzberg | ................ H04L 9/085 380/286 |
| 6,701,435 | B1 | * | 3/2004 | Numao | ................... H04L 9/085 380/277 |
| 8,699,715 | B1 | * | 4/2014 | Juels | ....................... G06F 21/34 380/278 |
| 8,874,904 | B1 | * | 10/2014 | Juels | ....................... H04L 9/088 713/156 |
| 8,909,939 | B1 | * | 12/2014 | Beda, III | ................ G06F 21/53 713/189 |

(Continued)

*Primary Examiner* — Robert Leung
(74) *Attorney, Agent, or Firm* — Daniel P. Morris, Esq.; Otterstedt, Ellenbogen & Kammer, LLP

(57) ABSTRACT

A server system for implementing a distributed cryptographic protocol includes a machine management server which comprises a current virtual machine configured to implement the protocol using a set of communication keys and state information for the protocol. The system further includes a memory and a refresh server. The system is configured, for each of successive new time periods in operation of the protocol, to perform a refresh operation wherein: the refresh server retrieves the state information from the memory, generates a new set of communication keys, and sends the state information and new set of keys to the machine management server; the machine management server configures a new virtual machine for implementing the protocol, whereby the new virtual machine receives the new set of keys and state information sent by the refresh server; and the new virtual machine assumes operation as the current virtual machine for the new time period and stores state information for that time period in the memory.

11 Claims, 3 Drawing Sheets

(56) References Cited

U.S. PATENT DOCUMENTS

| | | | | |
|---|---|---|---|---|
| 8,977,847 B1 * | 3/2015 | Juels | ............................ | H04L 9/32 |
| | | | | 713/162 |
| 9,032,212 B1 * | 5/2015 | Juels | ...................... | H04L 9/3271 |
| | | | | 713/176 |

* cited by examiner

SERVER SYSTEMS FOR DISTRIBUTED CRYPTOGRAPHIC PROTOCOLS

BACKGROUND

The present invention relates generally to server systems for implementing distributed cryptographic protocols, and more specifically to server systems providing proactive security in such protocols.

Protecting information is essential in the digital economy. A common way to protect data is to use cryptographic protocols to process the data in some way, but it is then necessary to protect the state information for such protocols. This state information comprises the secret values, such as cryptographic keys, used by servers which implement the cryptographic algorithms. To reduce exposure to offline attack through server compromise, cryptographic protocols may be implemented in a distributed fashion. In distributed protocols, a plurality of servers communicate via a network to collectively implement the protocol. This enhances security because protocol operation requires cooperation of more than one server, so more than one server must be hacked for the protocol to be subverted. It is common practice, for example, to distribute (secret share) cryptographic keys between a plurality of servers which can perform operations with the shared key in a distributed fashion to collectively implement some protocol. Cryptography offers a rich body of distributed protocols including secret sharing schemes, signature schemes and encryption schemes, as well as more advanced protocols such as threshold password-authenticated secret sharing schemes.

Resistance against server compromise is one thing, but knowing how to recover from such an event is another. In cryptographic literature, recovery from compromise is known as proactive security, or security against transient corruptions. Known schemes with proactive security allow a secret key to be refreshed by periodically re-sharing the key among the servers. The servers engage in an interactive refresh protocol to re-compute their key-shares for each new time period in operation of the distributed protocol.

SUMMARY

According to at least one embodiment of the present invention there is provided server system for operation as one of multiple such server systems, connectable via a network, to implement a distributed cryptographic protocol. The server system includes a machine management server which is operable to provide a plurality of virtual machines. The machine management server includes a current virtual machine which is adapted to implement the protocol using a set of communication keys, for communications with other said server systems via the network, and state information for the protocol. The server system further comprises a memory, operatively associated with the machine management server, for storing the state information, and a refresh server which is adapted for secure communications with the machine management server. The server system is configured, for each of successive new time periods in operation of the protocol, to perform a refresh operation in which: the refresh server retrieves the state information from the memory, generates a new set of communication keys, and sends the state information and new set of keys to the machine management server; the machine management server configures a new virtual machine for implementing the protocol, whereby the new virtual machine receives the new set of keys and state information sent by the refresh server; and the new virtual machine assumes operation as the current virtual machine for the new time period and stores state information for that time period in the memory.

Embodiments of the invention will be described in more detail below, by way of illustrative and non-limiting example, with reference to the accompanying drawings.

BRIEF DESCRIPTION OF THE SEVERAL VIEWS OF THE DRAWINGS

The following drawings are presented by way of example only and without limitation, wherein like reference numerals (when used) indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Principles of the present invention will be described herein in the context of illustrative server apparatus and methods for implementing a distributed cryptographic protocol. It is to be appreciated, however, that the invention is not limited to the specific apparatus and/or methods illustratively shown and described herein. Rather, it will become apparent to those skilled in the art given the teachings herein that numerous modifications can be made to the embodiments shown that are within the scope of the claimed invention. That is, no limitations with respect to the embodiments shown and described herein are intended or should be inferred.

Figure 1:
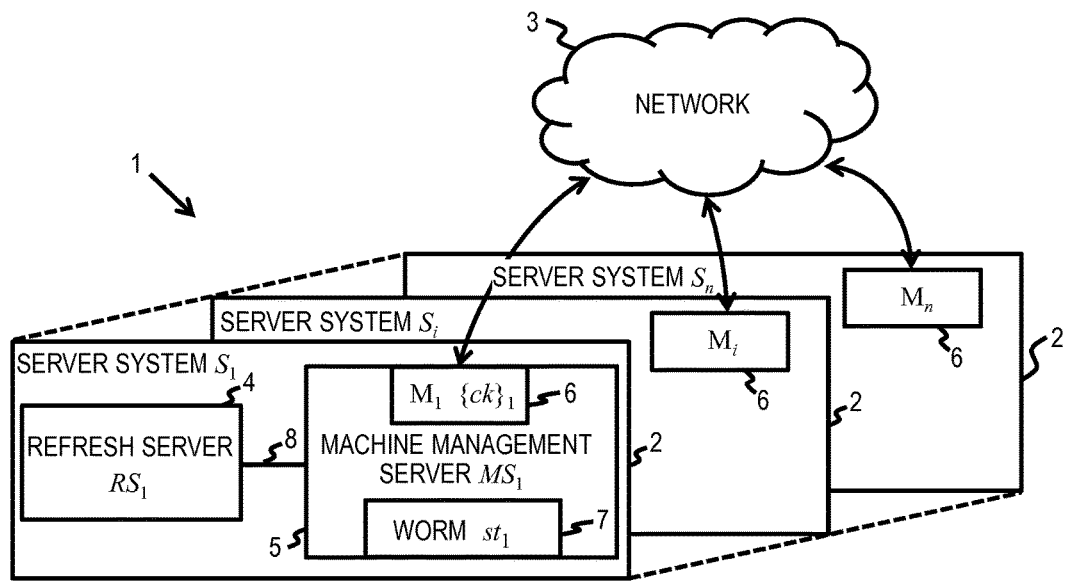
FIG. 1 is a schematic representation of a distributed system including server systems embodying the invention.

FIG. 1 is a schematic block diagram of a distributed processing system 1 comprising a plurality n of servers systems 2 embodying the invention. The server systems are denoted by $S_i$ ($1 \leq i \leq n$), where in general $n \geq 2$, and preferably $n > 2$. In general, higher values of n offer greater security against offline attack through server compromise. The value of n can thus be selected according to security requirements for a given system. The server systems $S_1, \ldots, S_n$ are connectable via a network 3 (which may in general comprise one or more component networks and/or internetworks, including the Internet) to implement a distributed cryptographic protocol. The cryptographic protocol may, for instance, comprise a secret sharing scheme, a signature scheme, an encryption scheme, or a password-authentication scheme. However, the particular functionality of the cryptographic protocol is orthogonal to the system operation to be described.

Each server system 2 comprises a refresh server 4 and a machine management server 5 as illustrated for server system $S_1$ in the figure (the additional server systems $S_i$, $i > 1$, being shown in abstracted form for simplicity). The refresh server 4 of system $S_i$ is denoted by $RS_i$. $MS_i$ denotes the machine management server 5 of system $S_i$. Each machine management server $MS_i$ is operable to provide a plurality of virtual machines, and includes a current virtual machine 6, denoted by $M_i$. The current virtual machine $M_i$ is adapted to implement the cryptographic protocol in communication with the current virtual machines $M_j$, $j \neq i$, of other server systems 2 via network 3. To implement the protocol, each current machine $M_i$ uses a set of cryptographic communication keys, denoted by $\{ck\}_i$, for communications with other server systems 2, and state information $st_i$ for the protocol. The key-set $\{ck\}_i$ may in general comprise one or more communication keys which are used to process messages communicated between servers, e.g. for message encryption and/or authentication purposes, and typically comprises at least one public/private key pair in accordance with a PKI (Public Key Infrastructure) system. (PKI systems are well known in the art and the operational details are orthogonal to systems described herein). The state information $st_i$ generally comprises one or more values which are used by current machine $M_i$ when running the protocol, and typically includes multiple values which may relate to the local machine state and/or the overall protocol state. Such values typically include at least one secret cryptographic key or key-share (secret to one or more machines $M_i$) which is required for correct operation of the protocol. This state information $st_i$ is stored, in one or more embodiments, in a WORM (write once read many) memory which is operatively associated with machine management server. State information $st_i$ can thus be written to WORM memory 7 by current machine $M_i$, and can be accessed as required via the $MS_i$, but is protected against over-writing in the memory. While not explicitly indicated in the figure (but implied), communication key-set $\{ck\}_i$ may also be stored in WORM memory 7 for convenience, and state values may be stored, at least temporally, in working memory of machine $M_i$ in operation.

The refresh server $RS_i$ of each server system 2 comprises functionality for implementing the refresh operation to be described, and is adapted for secure communications with the machine management server $MS_i$ for this operation. The servers $RS_i$ and $MS_i$ can thus communicate via some secure channel 8 which is protected from the network 3, which is generally considered insecure, via which machines $M_i$ communicate. Secure channel 8 can be protected by any convenient hardware and/or software mechanisms, and may be provided via a local or other network which is physically isolated or otherwise logically distinct from network 3. Secure channel 8 may, for instance, be established via a standard security protocol such as TLS (Transport Security Layer) or SSL (Secure Sockets Layer).

Figure 2:
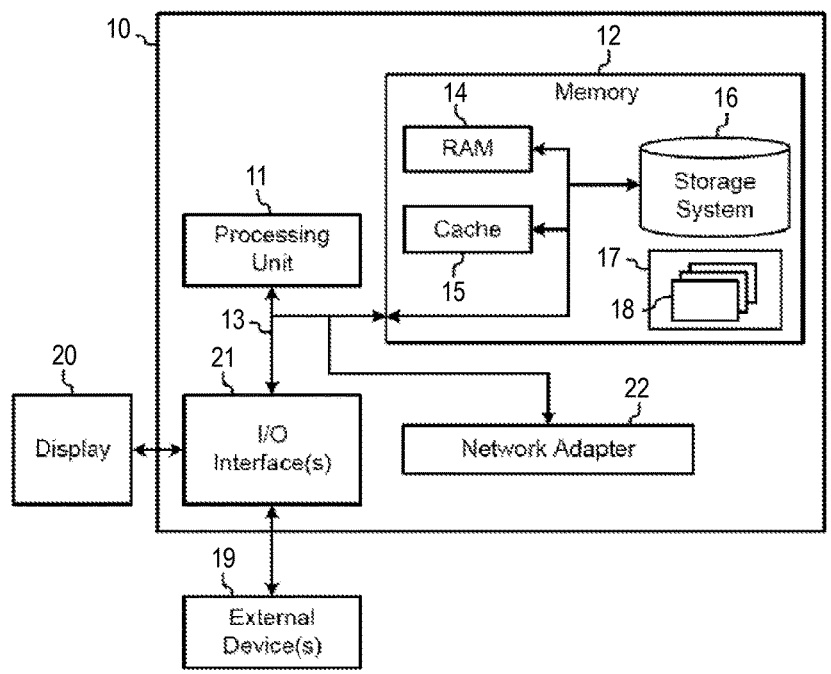
FIG. 2 is a generalized schematic of a computer in a server system of FIG. 1.

Each of the refresh and machine management servers 4, 5 in a server system 2 can be implemented by computing apparatus comprising one or more general- or special-purpose computers, each comprising one or more real or virtual machines, providing functionality for implementing the operations described herein. FIG. 2 is a block diagram of exemplary computing apparatus for implementing a computer of server system 2. The computing apparatus is shown in the form of a general-purpose computer 10. The components of computer 10 may include processing apparatus such as one or more processors represented by processing unit 11, a system memory 12, and a bus 13 that couples various system components including system memory 12 to processing unit 11.

Bus 13 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 10 typically includes a variety of computer readable media. Such media may be any available media that is accessible by computer 10 including volatile and non-volatile media, and removable and non-removable media. For example, system memory 12 can include computer readable media in the form of volatile memory, such as random access memory (RAM) 14 and/or cache memory 15. Computer 10 may further include other removable/non-removable, volatile/non-volatile computer system storage media. By way of example only, storage system 16 can be provided for reading from and writing to a non-removable, non-volatile magnetic medium (commonly called a "hard drive"). Although not explicitly shown (but implied), a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided. In such instances, each can be connected to bus 13 by one or more data media interfaces.

Memory 12 may include at least one program product having one or more program modules that are configured to carry out functions of embodiments of the invention. By way of example, program/utility 17, having a set (at least one) of program modules 18, may be stored in memory 12, as well as an operating system, one or more application programs, other program modules, and program data. Each of the operating system, one or more application programs, other program modules, and program data, or some combination thereof, may include an implementation of a networking environment. Program modules 18 generally carry out the functions and/or methodologies of embodiments of the invention as described herein.

Computer 10 may also communicate with: one or more external devices 19 such as a keyboard, a pointing device, a display 20, etc.; one or more devices that enable a user to interact with computer 10; and/or any devices (e.g., network card, modem, etc.) that enable computer 10 to communicate with one or more other computing devices. Such communication can occur via input/output (I/O) interfaces 21. Also, computer 10 can communicate with one or more networks such as a local area network (LAN), a general wide area network (WAN), and/or a public network (e.g., the Internet) via network adapter 22. As depicted, network adapter 22 communicates with the other components of computer 10 via bus 13. It should be understood that although not explicitly shown (but implied), other hardware and/or software components could be used in conjunction with computer 10. Examples include, but are not limited to: microcode, device drivers, redundant processing units, external disk drive arrays, redundant array of independent disks/drives (RAID) systems, tape drives, and data archival storage systems, etc.

Figure 3:
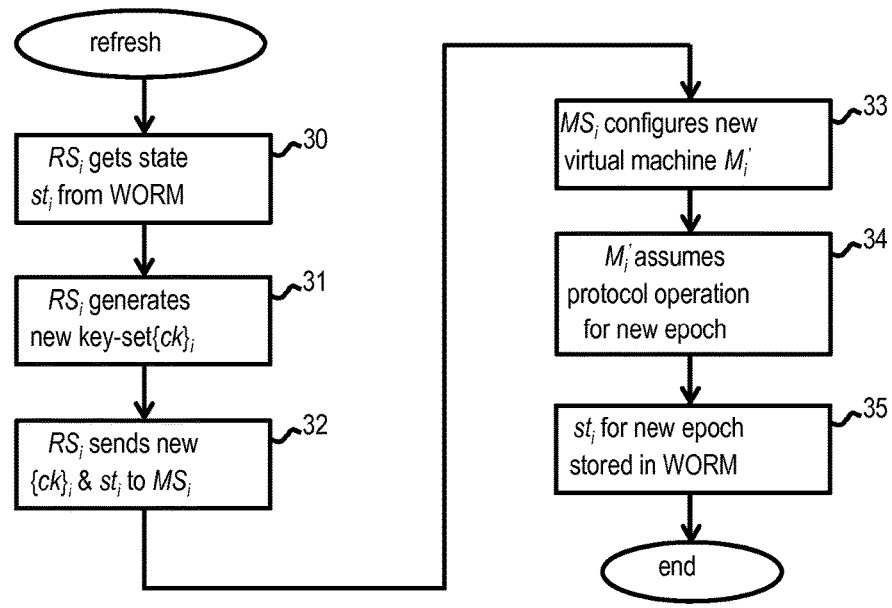
FIG. 3 indicates steps performed in a refresh operation of a server system of FIG. 1.

In operation of system 1, the current virtual machines $M_i$ of server systems 2 communicate via network 3 to collectively implement the distributed protocol using their respective communication keys $\{ck\}_i$ and state information $st_i$. Proactive security is provided in the system by periodic performance of a refresh operation. In particular, each server system $S_i$ is adapted, for each of successive new time periods in operation of the protocol, to perform a refresh operation for that system. The time periods, or "epochs," for which the refresh operation is performed may be defined in various ways in the system. For example, the refresh operation may be performed automatically for epochs of a predetermined duration, and/or a new epoch may be initiated in response to detection of an attack on system 1. FIG. 3 gives an overview of at least a portion of the main steps performed by a server system $S_i$ in the refresh operation for a new epoch.

With reference to FIG. 3, in a first step, step 30, of the refresh operation, the refresh server $RS_i$ retrieves the state information $st_i$ stored in WORM memory 7 through communication with machine management server $MS_i$ via secure channel 8. In step 31, the refresh server $RS_i$ generates a new set of communication keys $\{ck\}_i$ for use in the new epoch. In step 32, refresh server $RS_i$ sends the retrieved state information $st_i$ and the new set of keys $\{ck\}_i$ to the machine management server $MS_i$ via secure channel 8. In step 33, the machine management server $MS_i$ configures a new virtual machine $M_i'$ for implementing the protocol, whereby the new virtual machine receives the new set of keys $\{ck\}_i$ and state information $st_i$ sent by the refresh server. The new virtual machine $M_i'$ is thus set up with a fresh (clean) machine image $img_i$, comprising the operating system and all applications running on it and including the functionality for implementing the cryptographic protocol. This machine image $img_i$ can be updated with all the latest security patches of the operating system and overlying applications. In general, the fresh image $img_i$ may be constructed by refresh server $RS_i$ or machine management server $MS_i$, or obtained from any convenient source. The new key-set $\{ck\}_i$ and state information $st_i$ may be embedded in the image $img_i$ by the refresh server $RS_i$ or machine management server $MS_i$ for booting the new machine $M_i'$, or this information may be supplied separately to the machine $M_i'$. In step 34, the new virtual machine $M_i'$ assumes operation as the current virtual machine $M_i$ for the new epoch. This step can be implemented in a variety of ways, some of which are discussed below. As indicated at step 35, the new virtual machine $M_i'$ stores state information $st_i$ for the new epoch in WORM memory 7. The state information $st_i$ for the new epoch may include values inherited from the previous epoch (supplied by the refresh server in step 32 above) and/or new values generated for the new epoch based on the previous state. For example, the new machine $M_i'$ may communicate with other server systems $S_j$ to update some state values as described further below. State information for the new epoch may therefore be stored in WORM memory 7 before and/or after the new machine $M_i'$ assumes operation as current machine $M_i$ for the epoch. In preferred embodiments, new state values will be stored in WORM memory 7 immediately they are generated.

The arrangement and operation of server systems $S_i$ described above provides an efficient and elegantly simple mechanism for implementing proactive security. A fresh virtual machine $M_i$ is instantiated for each new epoch, avoiding inherited security issues due to machine compromise in prior epochs. The WORM memory prohibits overwriting of stored state information for an epoch, and the refresh server allows the necessary state information to be securely provided to the fresh machine together with fresh communication keys for each epoch. If a protocol machine $M_i$ is hacked, the adversary cannot change previously stored state information, and can only add additional values. Preferred embodiments described below additionally provide for authentication of stored state information.

Figure 4:
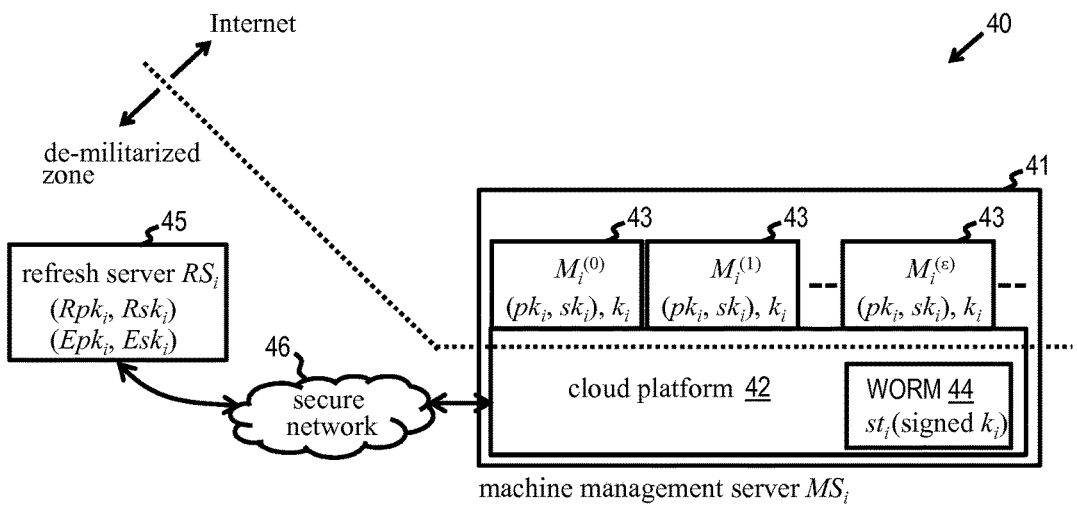
FIG. 4 is a schematic representation of an embodiment of the server system.

A preferred implementation for server system $S_i$ is illustrated in FIG. 4, according to an embodiment of the invention. In the system 40 of this example, the machine management server 41 is implemented by a cloud computing platform 42 which runs a current virtual machine 43, denoted by $M_i^{(\epsilon)}$ (where $\epsilon=0, 1, 2$, etc., indicates epoch number). A fresh virtual machine $M_i^{(0)}, M_i^{(1)}, M_i^{(2)}$, etc., is initiated on platform 42 for each of successive epochs $\epsilon=0, 1, 2, \ldots,$. A WORM object store 44 provided by cloud platform 42 stores the state information $st_i$ for the current virtual machine $M_i^{(\epsilon)}$ as described above. A refresh server 45 communicates with cloud platform 42 via a secure network 46 in this embodiment.

The key-set $\{ck\}_i$ used by current virtual machine $M_i^{(\epsilon)}$ in this embodiment comprises a machine signing-key pair ($pk_i$, $sk_i$), where $pk_i$ is a public machine key and $sk_i$ is a secret machine key. The machine $M_i^{(\epsilon)}$ also stores a key-share $k_i$ of a cryptographic key K which is shared between the n server systems implementing the distributed protocol. This key-share $k_i$ forms at least a part of the state information $st_i$ stored in WORM memory 44. In this illustrative embodiment, the key-share is cryptographically signed by machine $M_i^{(\epsilon)}$ when stored in WORM memory 44 as explained below. The refresh server 45 of this embodiment stores a server signing-key pair ($Rpk_i$, $Rsk_i$), where $Rpk_i$ is a public server signing key and $Rsk_i$ is a secret server signing key. Refresh server 45 may also store a server encryption-key pair ($Epk_i$, $Esk_i$), where $Epk_i$ is a public server encryption key and $Esk_i$ is a secret server encryption key. Public keys of the foregoing key-pairs are published in the distributed system as required.

The cloud platform 42 may in general comprise one or more computers each supporting one or more virtual machines. In a typical implementation, cloud platform 42 can be realized by a single physical machine or a cluster of physical machines. The refresh server 45 may comprise a single physical machine in this embodiment. This machine is connected only to the cloud software platform, and such connections can be physically isolated from the network (in this example the Internet) via which the virtual machines 43 communicate. In particular, the virtual machines $M_i^{(0)}, M_i^{(1)}, M_i^{(2)}, \ldots,$ are exposed to the Internet, while the cloud platform 42 and refresh server 45 are run in a protected environment (the "de-militarized zone"); i.e., behind one or more firewalls deployed in the cloud platform. The refresh server 45 is thus inaccessible from the Internet in normal operation of the cryptographic protocol, and is therefore protected from unauthorized Internet access. (Authorized access may of course be possible if required, e.g. for setup purposes prior to operation).

With the implementation of FIG. 4, server system 40 can exploit inherent features of modern cloud computing platforms such as, for instance, the OpenStack platform. Such platforms offer strong separation between the virtual machines which are exposed to the Internet, and are thus subject to attacks, and the cloud management interfaces that run in the demilitarized zone. New virtual machines can be created on the fly from images, machines can be shut down, and the routing of traffic to machines be dynamically configured. The platforms can also virtualize the storage for the virtual machines, offering different kinds of abstraction of hard-disks (such as file system, block store, object store, etc.). System setup can be managed as a manual process via a web interface in the de-militarized zone. However, system management operations can easily be automated with scripts to replace manual interaction with software-based control.

Figure 5:
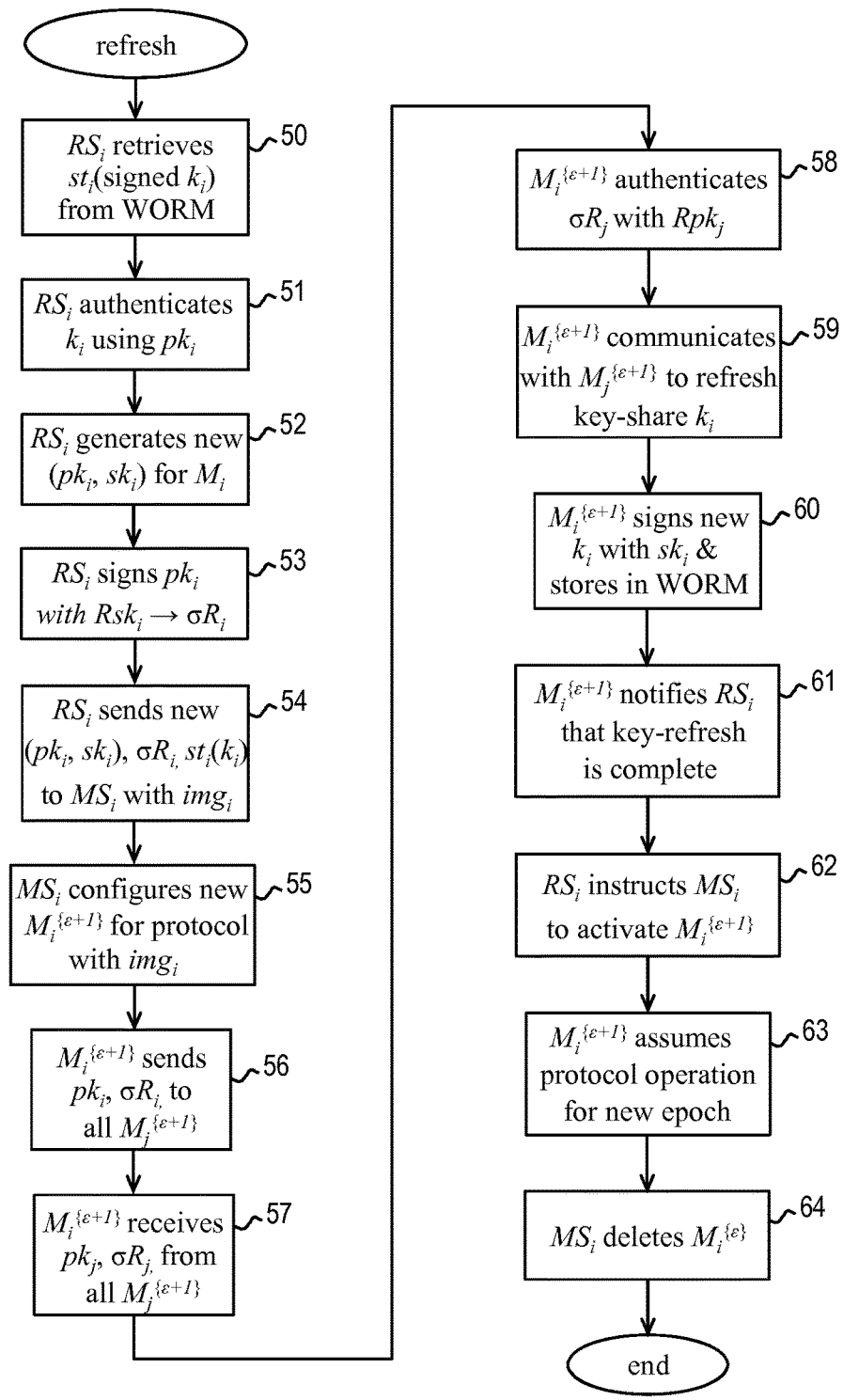
FIG. 5 indicates steps performed in a refresh operation of the FIG. 4 system.

In operation of the distributed protocol, according to one or more embodiments, the n virtual machines $M_i^{(\epsilon)}$, i=1 to n, communicate to implement a cryptographic protocol in which the key shares $k_i$ of a plurality of the machines $M_i^{(\epsilon)}$ can be combined to reconstruct the cryptographic key K for the protocol. The number of key-shares $k_i$ required here depends on the nature of the key-sharing scheme. Some schemes are so-called "n-out-of-n" schemes which require all key-shares $k_i$ to reconstruct the shared key K. Other schemes are so-called threshold (or "t-out-of-n") schemes in which only a threshold number $t \leq n$ of the key-shares are required. Time is divided into epochs separated by refresh operations performed by the n server systems 40. FIG. 5 indicates exemplary steps of this refresh operation, according to one or more embodiments of the invention.

In step 50 of FIG. 5, the refresh server $RS_i$ communicates with machine management server $MS_i$ via secure network 46 to retrieve the state information $st_i$, comprising the signed key-share $k_i$, stored in WORM memory 44. In particular, the key-share $k_i$, generated by current machine $M_i^{(\epsilon)}$ as described below, is signed by $M_i^{(\epsilon)}$ using its secret machine key $sk_i$, the resulting signed key-share being stored in WORM memory 44. In step 51, refresh server $RS_i$ authenticates the signed key-share $k_i$ by verifying the signature using the machine public key $pk_i$. Any other state information retrieved in step 50 may be similarly signed by $M_i^{(\epsilon)}$ and authenticated by $RS_i$ in this step.

In step 52, the refresh server $RS_i$ generates a new machine signing-key pair $(pk_i, sk_i)$ for the new epoch $(\epsilon+1)$. In step 53 of this embodiment, the refresh server signs the new public machine key $pk_i$ with the secret server signing key $Rsk_i$ to produce a server signature $\sigma R_i$. In this example, the refresh server $RS_i$ generates the clean image $img_i$ for the new virtual machine $M_i^{(\epsilon+1)}$. In step 54, $RS_i$ instructs machine management server $MS_i$ to start $M_i^{(\epsilon+1)}$, sending $MS_i$ the clean image $img_i$, the state information $st_i$ and the new machine signing-key pair $(pk_i, sk_i)$, with associated server signature $\sigma R_i$. The values $st_i$, $(pk_i, sk_i)$, and $\sigma R_i$ can be injected by $RS_i$ into the image $img_i$ supplied to $MS_i$ here. In step 55, the machine management server then configures a new virtual machine $M_i^{(\epsilon+1)}$ with the image $img_i$, and starts the new machine.

In step 56, the new machine $M_i^{(\epsilon+1)}$ sends its new public machine key $pk_i$, and accompanying server signature $\sigma R_i$, via the Internet to each of the (n−1) other server systems $S_j$. (The identities, i.e. IP addresses of all machines are assumed to be known to all other machines here. This can be achieved in various ways, e.g. by assigning addresses to machines in some pre-agreed fashion, as will be apparent to those skilled in the art). The new machine $M_i^{(\epsilon+1)}$ thus receives a corresponding new public machine key $pk_j$, and corresponding server signature $\sigma R_j$, from each other server system $S_j$ as indicated at step 57. In step 58, the new machine $M_i^{(\epsilon+1)}$ authenticates each server signature $\sigma R_j$ for $pk_j$ using the public server signing key $Rpk_j$ for that system. In this way, all public machine signing keys in the distributed system can be authenticated as genuine keys issued by the secure refresh servers of the system.

In step 59, the new virtual machine $M_i^{(\epsilon+1)}$ communicates with the new machines $M_j^{(\epsilon+1)}$ of other server systems $S_j$ to generate a new key-share $k_i$ for the new epoch. The precise steps performed here will depend upon specifics of the distributed protocol. By way of example, however, refresh of the key-shares may be achieved as follows, according to one or more embodiments of the invention. First, each new machine $M_i^{(\epsilon+1)}$ computes random shares of the current key-share $k_i$ supplied by the refresh server. The resulting random shares are denoted by $\{k_{(i,j)}\}_{j=1, \ldots, n}$, and thus comprise one share $k_{(i,j)}$ for each of the n systems $S_j$. The new machine $M_i^{(\epsilon+1)}$ then sends the other systems' shares $\{k_{(i,j)}\}_{j \neq i}$ to respective systems $S_j$, and deletes the old key-share $k_i$. Following this process, new machine $M_i^{(\epsilon+1)}$ will possess n shares $k_{(1,i)}, \ldots, k_{(n,i)}$, and from these computes its new key-share $k_i$. The computation here again depends on the particular secret sharing scheme. By way of example, however, for linear secret sharing schemes the computation may be:

$$\text{new } k_i = \Sigma_{j=1}^{n} k_{(j,i)}.$$

Note that these and all further communications between the new virtual machines can be authenticated using the new machine signing-key pairs $(pk_i, sk_i)$. That is, messages signed by a machine with its secret signing-key $sk_i$ can be verified by a receiver using the corresponding public key $pk_i$.

The new machine $M_i^{(\epsilon+1)}$ stores its newly-generated key-share $k_i$ in its WORM object store 44 in step 60. In this embodiment, $M_i^{(\epsilon+1)}$ signs the new key-share $k_i$ using its new secret key $sk_i$, and stores the resulting signed key-share (comprising the new $k_i$ and a machine signature $\sigma M_i$ thereon) in WORM memory 44. In some embodiments, other state information for the protocol may be generated by new machine $M_i^{(\epsilon+1)}$ in this preliminary phase, and such information can be similarly signed and stored in WORM memory 44. Any other state information sent by the refresh server in step 54 and relevant to the new epoch, or state information received from other systems $S_j$, may be stored in the WORM memory in this or an earlier step, and may be signed by $M_i^{(\epsilon+1)}$ as appropriate.

In step 61, new machine $M_i^{(\epsilon+1)}$ notifies the refresh server $RS_i$, via machine management server $MS_i$, that the initialization operation is complete. The refresh servers $RS_i$ of systems $S_i$ may then synchronize (e.g. through Internet communications via $MS_i$) and agree on switching protocol operation to the new machines $M_i^{(\epsilon+1)}$. Alternatively, for example, switching times may be predetermined in the system, or controlled in other ways as discussed below. To start the new epoch here, in step 62 the refresh server $RS_i$ instructs machine management server $MS_i$ to activate the new machine $M_i^{(\epsilon+1)}$ for the protocol. This step may involve a command to $MS_i$ to switch the IP address of the current machine for the protocol, or to attach the new machine $M_i^{(\epsilon+1)}$ to a different network, etc. In step 63, the machine management server $MS_i$ activates the new machine $M_i^{(\epsilon+1)}$ accordingly, and the new machine assumes operation as the current machine $M_i$ for the new epoch. All protocol communications can then be authenticated using the new machine signing-key pair $(pk_i, sk_i)$. Any additional state information generated by this machine in the new epoch will be stored in WORM memory 44, preferably signed with $sk_i$ as described above. After switching protocol operation to the new machine, in step 64 the machine management server $MS_i$ will switch off and delete the machine $M_i^{(\epsilon)}$ for the previous epoch, e.g. on command from $RS_i$.

The above system allows secure refresh as before, and also permits authentication of state information by the refresh server $RS_i$ through verification of machine signatures on retrieval. All public machine signing keys can also be authenticated based on the refresh server signatures $\sigma R_i$. The server signing-key pair $(Rpk_i, Rsk_i)$ can be certified by a trusted Certification Authority, and the root signature for this certification can be embedded in all machine images $img_i$. Whenever a signature is checked with respect to $Rpk_i$, the certificate on $Rpk_i$ can be verified with respect to the root certificate in known manner.

In a modification to the above embodiment where the refresh server $RS_i$ has an encryption-key pair ($Epk_i$, $Esk_i$), each new virtual machine $M_i^{(\epsilon)}$ can be adapted to encrypt state information generated by that machine and stored in the WORM memory (plus state information received from other machines if desired), with the public server encryption key $Epk_i$. The refresh server $RS_i$ then uses its secret server encryption key $Esk_i$ to decrypt the encrypted state information retrieved from the WORM memory in the refresh operation.

Many other changes and modifications can, of course, be made to the exemplary embodiments described above that are within the scope of embodiments of the present invention. For example, the set of communication keys $\{ck\}_i$ may include additional key-pairs, e.g. different key-pairs for communications with different systems $S_j$, which can be treated in like manner to ($pk_i$, $sk_i$) above. The key-set $\{ck\}_i$ may further include one or more machine encryption-key pairs ($epk_i$, $esk_i$), $epk_i$ being a public machine encryption key and $esk_i$ a secret machine encryption key, to allow the current virtual machine to encrypt communications with other server systems $S_j$ using its secret machine encryption key $sk_i$. The protocol key K shared between systems $S_i$ may be a secret (asymmetric) key or a symmetric key.

The activation of new virtual machines may be managed in other ways to that described above. For example, the new machine $M_i^{(\epsilon+1)}$ may notify a load balancer for the distributed system when it has completed its initialization procedure, and the load balancer may control activation for the new epoch if all, or sufficiently many, machines $M_i^{(\epsilon+1)}$ in the system have given notification. For t-out-of-n threshold protocols in particular, it may be sufficient for the threshold number t of machines to be ready for activation. The refresh server $RS_i$ may similarly control machine activation based on readiness of a threshold number of machines.

Embodiments may be envisaged wherein a refresh server is shared by more than one server system $S_i$, and/or a given cloud platform implements more than one machine management server $MS_i$. In general, steps shown in flow diagrams may be performed in a different order to that indicated, and some steps may be performed concurrently, as appropriate, particularly in a distributed computing environment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A server system for operation as one of multiple such server systems connectable via a network to implement a distributed cryptographic protocol, the server system comprising:
   a machine management server, configured to provide a plurality of virtual machines, including a current virtual machine which is adapted to implement said protocol using a set of communication keys, for communications with other said server systems via the network, and state information for the protocol;
   a memory, operatively associated with the machine management server, for storing said state information; and
   a refresh server configured for secure communications with the machine management server;
   wherein the server system is configured, for each of successive new time periods in operation of the protocol, to perform a refresh operation in which:
   the refresh server retrieves said state information from the memory, generates a new set of communication keys, and sends the state information and new set of keys to the machine management server;
   the machine management server configures a new virtual machine for implementing the protocol, whereby the new virtual machine receives the new set of keys and state information sent by the refresh server; and
   the new virtual machine assumes operation as said current virtual machine for the new time period and stores state information for that time period in the memory.

2. The server system as recited in claim 1, wherein said set of communication keys comprises a machine signing-key pair ($pk_i$, $sk_i$), where $pk_i$ is a public machine key and $sk_i$ is a secret machine key, and wherein:
   the new virtual machine is configured to sign state information generated by that machine with the secret machine key $sk_i$ and to store the signed state information in the memory; and
   the refresh server is configured to authenticate the signed state information, retrieved from the memory in the next refresh operation, using the public machine key $pk_i$.

3. The server system as recited in claim 2, wherein the refresh server stores a server signing-key pair ($Rpk_i$, $Rsk_i$), where $Rpk_i$ is a public server signing key and $Rsk_i$ is a secret server signing key, and wherein:
   the refresh server is adapted to sign a new public machine key $pk_i$, of a new machine signing-key pair ($pk_i$, $sk_i$) generated in said refresh operation, with the secret server signing key $Rsk_i$ to produce a server signature $\sigma R_i$, and to send the server signature $\sigma R_i$ to the machine management server with the new machine signing-key pair; and
   the new virtual machine is adapted to send the server signature $\sigma R_i$ and new public machine key $pk_i$ via the network to the other said server systems.

4. The server system as recited in claim 3, wherein the new virtual machine is configured to authenticate a corresponding server signature $\sigma R_j$ for a corresponding public machine key $pk_j$ received from another of said server systems using a public server signing key $Rpk_j$ for that system.

5. The server system as recited in claim 1, wherein said state information comprises a key-share $k_i$ of a cryptographic key K which is shared between the multiple server systems, and wherein the new virtual machine is configured to communicate with the other said server systems to generate a new key-share $k_i$ for the new time period, and to store the new key-share $k_i$ in the memory.

6. The server system as recited in claim 2, wherein said state information comprises a key-share $k_i$ of a cryptographic key K which is shared between the multiple server systems, and wherein the new virtual machine is configured to communicate with the other said server systems to generate a new key-share $k_i$ for the new time period, to sign the new key-share $k_i$ with said secret machine key $sk_i$, and to store the signed key-share in the memory.

7. The server system as recited in claim 1, wherein the refresh server stores a server encryption-key pair ($Epk_i$, $Esk_i$), where $Epk_i$ is a public server encryption key and $Esk_i$ is a secret server encryption key, and wherein:

the new virtual machine is adapted to encrypt state information generated by that machine, and stored in the memory, with the public server encryption key $Epk_i$; and the refresh server is adapted to decrypt state information encrypted with the public server encryption key, and retrieved from the memory in said refresh operation, using the secret server encryption key $Esk_i$.

8. The server system as recited in claim 1, wherein the refresh server is further configured, in said refresh operation, to send the machine management server a machine image for configuring the new virtual machine.

9. The server system as recited in claim 1, wherein the machine management server comprises a cloud computing platform.

10. The server system as recited in claim 1, wherein the memory comprises write once read many (WORM) memory.

11. A distributed system comprising a plurality of server systems connected together via a network to implement a distributed cryptographic protocol, each of at least a subset of the plurality of server systems comprising:

a machine management server, configured to provide a plurality of virtual machines, including a current virtual machine which is adapted to implement said protocol using a set of communication keys, for communications with other said plurality of server systems via the network, and state information for the protocol;

a memory, operatively associated with the machine management server, for storing said state information; and a refresh server configured for secure communications with the machine management server;

wherein the server system is configured, for each of successive new time periods in operation of the protocol, to perform a refresh operation in which:

the refresh server retrieves said state information from the memory, generates a new set of communication keys, and sends the state information and new set of keys to the machine management server;

the machine management server configures a new virtual machine for implementing the protocol, whereby the new virtual machine receives the new set of keys and state information sent by the refresh server; and the new virtual machine assumes operation as said current virtual machine for the new time period and stores state information for that time period in the memory.

\* \* \* \* \*